(12) United States Patent
Wang et al.

(10) Patent No.: US 7,613,894 B2
(45) Date of Patent: Nov. 3, 2009

(54) POWER LOSS RECOVERY IN NON-VOLATILE MEMORY

(76) Inventors: Hong Yu Wang, Room 301, No. 8, Lane 158, Baocheng Road, Minhang District, Shanghai, 201100 (CN); John Rudelic, 1025 Sandwick Way, Folsom, CA (US) 95630

( * ) Notice: Subject to any disclaimer, the term of this patent is extended or adjusted under 35 U.S.C. 154(b) by 237 days.

(21) Appl. No.: 11/218,371

(22) Filed: Sep. 2, 2005

(65) Prior Publication Data
US 2007/0055816 A1    Mar. 8, 2007

(51) Int. Cl.
*G06F 13/00*    (2006.01)
(52) U.S. Cl. .................. 711/170; 711/103; 711/104; 711/125; 711/156; 713/2
(58) Field of Classification Search ............. 711/103, 711/104, 125, 156; 713/2
See application file for complete search history.

(56) References Cited

U.S. PATENT DOCUMENTS

| 2004/0010681 A1* | 1/2004 | Lee .................................. 713/2 |
| 2005/0068842 A1* | 3/2005 | Tominaga ..................... 365/232 |
| 2006/0069851 A1* | 3/2006 | Chung et al. ................. 711/103 |
| 2007/0016721 A1* | 1/2007 | Gay ............................ 711/103 |

* cited by examiner

*Primary Examiner*—Tuan V Thai
*Assistant Examiner*—Yong Choe
(74) *Attorney, Agent, or Firm*—Blakely, Sokoloff, Taylor & Zafman LLP

(57) ABSTRACT

A method that may be used in a no bit-twiddling file system of a non-volatile memory. The method comprises writing to a non-volatile memory a data sector of a file system, and writing to the non-volatile memory of a control sector that comprises a first seed at a start of the control sector, a pointer to the data sector and a second seed at an end of the control sector. The method further comprises updating a link structure table entry associated with the control sector.

10 Claims, 7 Drawing Sheets

410

| Start Seed 411 | Sector Data 413 | Type 414 | Pointer/ Index 415 | Checksum Data 418 | End Seed 412 |

| Start Seed 421 | Sector Data 423 | Type 424 | Version Number 426 | Sector Number 427 | Checksum Data 428 | End Seed 422 |

| Sector Data 433 |

| Start Seed 441 | Sector Data 443 | Type 444 | Checksum Data 448 | End Seed 442 |

FIG. 4(d)

POWER LOSS RECOVERY IN NON-VOLATILE MEMORY

BACKGROUND

A non-volatile memory may comprise multiple sectors. Each sector may have a respective header to represent one or more states of the sector, including: for example, Empty, Valid, Invalid and Corrupt. In order to identify the exact situation of power loss and make recovery appropriately, sequentially changing states in a sector header may track the progress of each file or data write. However, each sector state may be represented by, for example, 1 or 2 bits. All states need to be changed in a separate write, which needs the ability to twiddle 1 or 2 bits or small size of data without impacting other bit's value. With the evolution of non-volatile memory hardware technology, the bit-twiddling operation is becoming a bottleneck of reaching to higher write performance.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 illustrates embodiments of different sectors in a non-volatile memory.

DETAILED DESCRIPTION

The following description describes techniques for realizing power loss recovery in a non-volatile memory. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
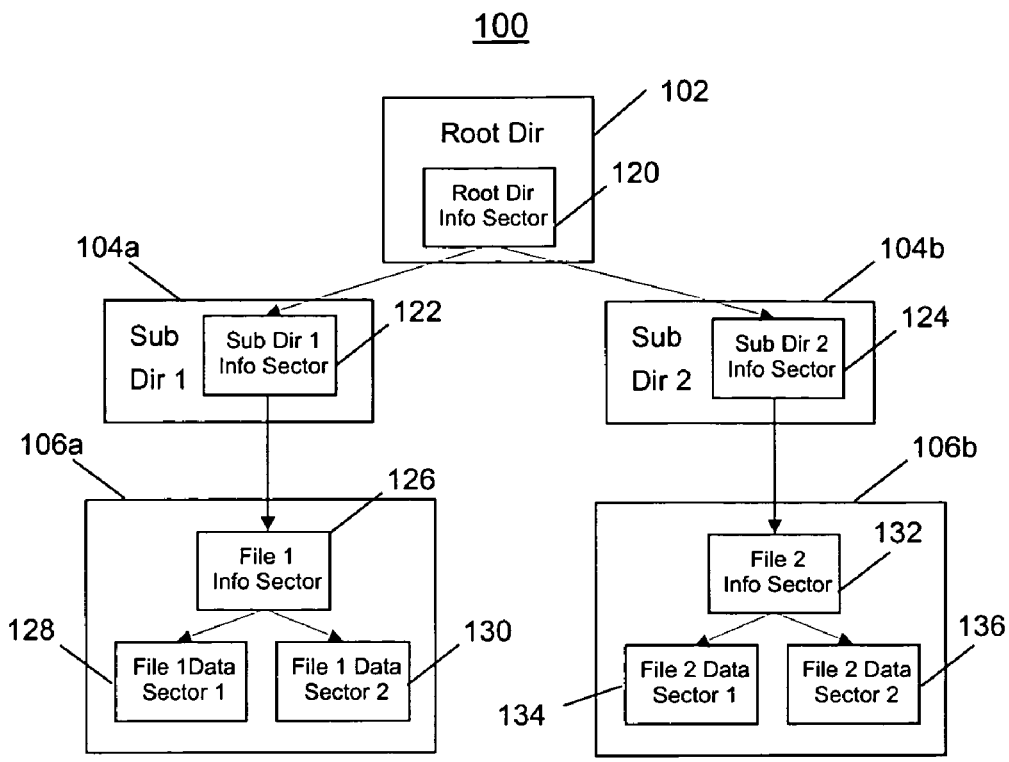
FIG. 1 illustrates an embodiment of a file system in a non-volatile memory.

Referring now to FIG. 1, a file system 100 in a non-volatile memory may comprise, for example, a tree-shaped directory-file structure. In one embodiment, the tree-shaped file system 100 may comprise a root directory 102. Root directory 102 may comprise a root directory info sector such as root directory info sector 120.

With reference to FIG. 1, in one embodiment, file system 100 may further comprise sub-directories 104a and 104b; however, other embodiments may comprise a different number of sub-directories. Sub-directories 104a and 104b may comprise sub-directory info sectors 122 and 124, respectively. In one embodiment, root directory info sector 120 may be associated with sub-directory info sectors 122 and 124; however, in other embodiments, root directory info sector 120 may be associated with a different number of sub-directory info sectors to support more or fewer sub-directories. In another embodiment, file system 100 may comprise more levels of sub-directories.

Referring to FIG. 1, in one embodiment, file system 100 may further comprise files 106a and 106b. File 106a may comprise file info sector 126 and file data sectors 128 and 130, and file 106b may comprise file info sector 132 and file data sectors 134 and 136; however, other embodiments may comprise a different number of files, each of which may comprise a different number of file data sectors.

As shown in FIG. 1, sub-directory info sector 122 may be associated with file info sector 126, and sub-directory info sector 124 may be associated with file info sectors 132; however, in other embodiments, a sub-directory info sector may be associated with a different number of file info sectors. Further, file info sector 126 may be associated with file data sectors 128 and 130, and file info sector 132 may be associated with file data sectors 134 and 136; however, in other embodiments, a file info sector may be associated with a different number of file data sectors belonging to the same file as the file info sector. In one embodiment, a sub-directory info sector may be associated with another sub-directory info sector. For example, the file system of the non-volatile memory may comprise two levels of sub-directories, wherein a first sub-directory info sector belonging to the first level may be associated with a second sub-directory info sector belonging to the second level and one of the first and second sub-directory info sectors may be associated with a file info sector and the other of the first and second sub-directory info sectors may be associated with a root directory info sector. However, in other embodiments, the file system may comprise other arrangements so as to accommodate more levels of sub-directory info sector.

Figure 2:
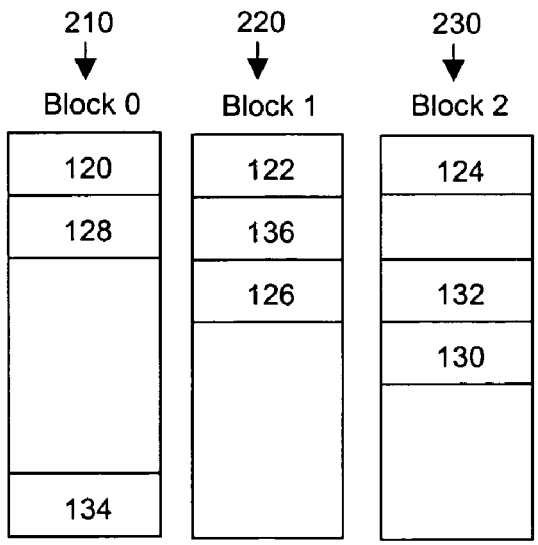
FIG. 2 illustrates an embodiment of a non-volatile memory having the file system of FIG. 1.

Referring to FIG. 2, an embodiment of a non-volatile memory 200 having file system 100 of FIG. 1 is illustrated. As shown in FIG. 2, non-volatile memory 200 may be organized into three blocks 210, 220 and 230; however, other embodiments may comprise a different number of blocks. Each of blocks 210, 220 and 230 may be divided into sectors. In one embodiment, one or more sectors of a file system may be allocated in each of blocks 210, 220 and 230. For example, sectors 120, 128 and 134 of the file system 100 of FIG. 1 may be allocated in block 210; however, in other embodiments, sectors of a file system may be allocated at different locations of a non-volatile memory in a different way. In one embodiment, each sector may have a fixed size. In another embodiment, the size of various sectors may be uniform across a file system.

Figure 3:
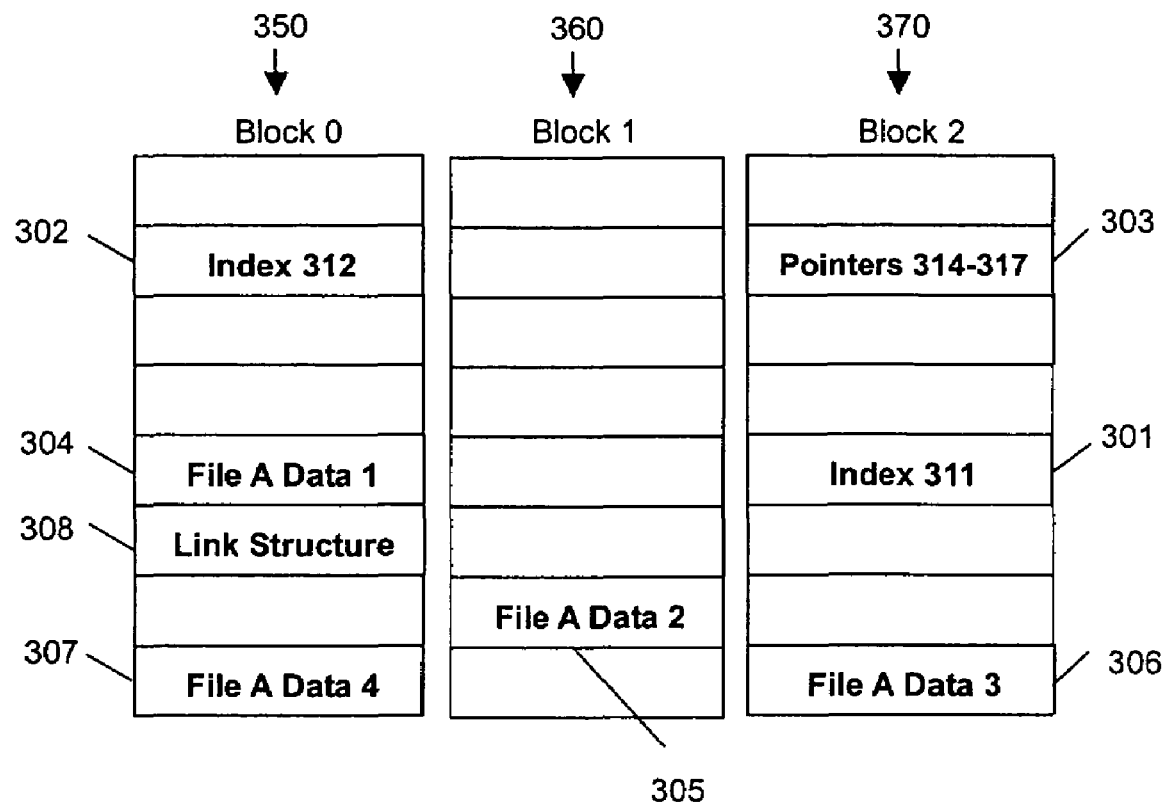
FIG. 3 illustrates another embodiment of a non-volatile memory having a file system and a link state structure of the file system.

Referring to FIG. 3, a non-volatile memory may comprise one or more blocks, such as blocks 350, 360 and 370. Each of blocks 350, 360 and 370 may be divided into a plurality of sectors, such as eight sectors; however, other embodiments may have a different number of sectors. In one embodiment, the file system of the non-volatile memory may comprise one or more data sectors and one or more control sectors. In one embodiment, a data sector may comprise content of a file or a portion thereof. For example, data sectors may comprise file data sectors 304-307, etc. In another embodiment, a control sector may link a data sector to a file system of a non-volatile memory. For example, control sectors may comprise file info sector 303, sub-directory info sector 302, and root directory info sector 301, etc.

Figure 6:
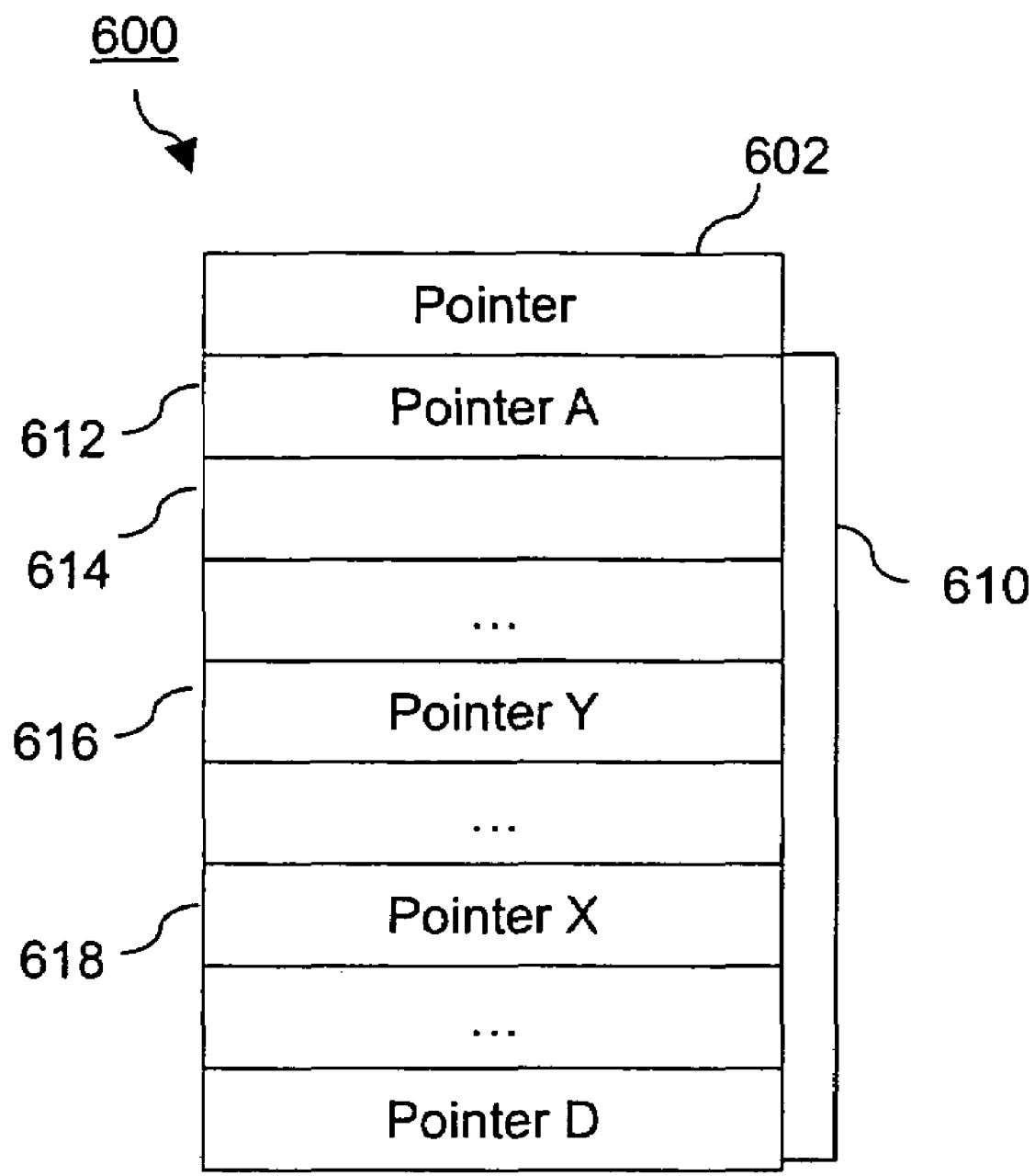
FIG. 6 illustrates an embodiment of a link structure table.

In one embodiment, the file system of non-volatile memory of FIG. 3 may further comprise a link structure table that may be maintained in one or more sectors, such as link structure sector 308. FIG. 6 shows an embodiment of a link structure table 600. In one embodiment, link structure table 600 may comprise one or more entries 610 that may define a link structure of a file system in a non-volatile memory. For example, an entry in link structure table 600 may be associated with a control sector. For example, entry 616 may be associated with a file info sector and entry 618 may be associated with a sub-directory info sector; however, in other embodiments, link structure table 600 may comprise other entries that may each be assigned to a control sector.

Referring to FIG. 6, in one embodiment, link structure table 600 may comprise a pointer 602 that may indicate a location of a control sector. For example, entry 616 associated with a file info sector may comprise pointer Y that may indicate the location of the file info sector in the file system. In another embodiment, entry 618 associated with a sub-directory info sector may comprise pointer X that may point to the sub-directory info sector in the file system. In yet another embodiment, a predetermined link structure table entry may be assigned to a root directory info sector, for example, a first entry 612. In another embodiment, entry 614 may reserve blank for a pointer to a new control sector to be written to the non-volatile memory; however, other blank entries may be used for new control sectors.

Referring now to FIGS. 4(a)-4(c), embodiments of different sectors are described in the following. FIG. 4(a) illustrates an embodiment of a control sector 410. In one embodiment, control sector 410 may comprise a start seed 411 at the start of control sector 410 and an end seed 412 at the end of control sector 410. Start seed 411 may comprise one or more bits and may indicate the beginning of control sector 410. The end seed 412 may comprise one or more bits and may indicate the end of control sector 410. In one embodiment, start seed 411 or end seed 412 may comprise a flag, a data seed, or the like. In another embodiment, start and end seeds 411 and 412 may comprise a predetermined flag or data seed. In yet another embodiment, start and end seeds 411 and 412 may have the same representation.

Referring to FIG. 4(a), in another embodiment, control sector 410 may comprise a sector data portion 413. For example, sector data portion 413 may comprise one or more bits. In one embodiment, sector data portion 413 may comprise sector info of control sector 410. For example, a sector data portion of root directory info sector 120 as shown in FIG. 1 may comprise root directory info such as the name or ID of root directory 102 and/or attribute data associated with root directory 102, etc. In another embodiment, a sector data portion of sub-directory info sector 122 as shown in FIG. 1 may comprise sub-directory info, for example, the name or ID of sub-directory 104a, attribute data associated with sub-directory 104a and/or ID of a parent node or directory (for example, root directory 102 of FIG. 1) associated with sub-directory 104a, etc. In yet another embodiment, a sector data portion of file info sector 126 as shown in FIG. 1 may comprise file info such as the name or ID of file 106a, attribute data associated with file 106a and/or ID of a parent node or directory (for example, sub-directory 104a) associated with file 106a, etc.

As shown in FIG. 4(a), control sector 410 may comprise a type field 414 that may comprise one or more bits. In one embodiment, type field 414 may indicate the type of control sector 410, for example, indicating whether the control sector is a root directory info sector, a sub-directory info sector or a file info sector. In other embodiments, type field 414 may indicate types of other control sectors, if any. In one embodiment, type field 414 may have a predetermined value for each type.

In one embodiment, control sector 410 may comprise a pointer/index portion 415. For example, pointer/index portion 415 may comprise one or more bits. In one embodiment, pointer/index portion 415 may comprise one or more pointers that may each identify a data sector. For example, referring to FIG. 1, file info sector 126 may comprise pointers each pointing to file data sectors 128 and 130, respectively. In another embodiment, pointer/index portion 415 may comprise one or more indexes that may each identify a child control sector of control sector 410. In one embodiment, an index identifying a file info sector may comprise an ID of a file to which the file info sector belongs. In another embodiment, an index identifying a sub-directory info sector may comprise an ID of a sub-directory to which the sub-directory info sector belongs. For example, referring to FIG. 1, file info sector 126 may be a child control sector of sub-directory info sector 122 that may be a parent control sector of file info sector 126. In another embodiment, sub-directory info sector 122 may be a child control sector of root directory info sector 120 that may be a parent control sector of sub-directory info sector 122. In one embodiment, root directory info sector 120 may comprise an ID of sub-directory 104a to which sub-directory info sector 122 belongs, and an ID of sub-directory 104b to which sub-directory info sector 124 belongs. In another embodiment, sub-directory info sector 122 may comprise an ID of file 106a to which file info sector 126 belongs, and sub-directory info sector 124 may comprise an ID of file 106b to which file info sector 132 belongs.

In one embodiment, an index may correspond to a link structure table entry associated with a control sector that is identified by the index. For example, the ID of sub-directory 104a to which sub-directory info sector 122 belongs may be used to locate a link structure table (for example, 600) entry that may comprise a pointer to sub-directory info sector 122. In another embodiment, the ID of file 106a to which file info sector 126 belongs may be used to locate a link structure table entry that may comprise a pointer to file info sector 126. In yet another embodiment, ID of a root directory to which a root directory info sector belongs may have a predetermined value that may correspond to a predetermined link structure table entry. For example, an ID associated with a root directory info sector may have a predetermined minimum value, that may be used to locate a predetermined entry in a link structure table (for example, entry 612 of FIG. 6), which may comprise a pointer to the root directory info sector. For example, an ID of a root directory may have a value "0" to locate the first entry of a link structure table; however, other embodiments may use a different value to locate a different link structure table entry. In yet another embodiment, a pointer/index portion of a file info sector of a file may comprise one or more pointers that may each point to a file data sector of the file. In another embodiment, one or more indexes may each be reserved for a new control sector to be written into the non-volatile memory. For example, referring to FIG. 1, root directory info sector 120 may comprise two indexes that may identify sub-directory info sectors 122 and 124, respectively and the root directory info sector 120 may further comprise one or more indexes that may each be reserved for a new sub-directory info sector to be written into the non-volatile memory. In another embodiment, sub-directory info sector 122 may comprise an index that may identify file info sector 126 and one or more index that may each be assigned to a new file info sector to be stored in the non-volatile memory.

Although the structure of a control sector is specifically described with reference to FIG. 4(a), other embodiments may use a different structure. Although sector data portion 413, type field 414 and pointer/index portion 415 are arranged, for example, in the order as shown in FIG. 4(a), other embodiments may employ different arrangements. In one embodiment, each of sector data portion 413, type field 414 and pointer/index portion 415 may be located at a predetermined position of a control sector.

Now referring to FIG. 4(b), an embodiment of link structure sector 420 will be described. As shown in FIG. 4(b), link structure sector 420 may comprise a start seed 421 at the beginning of link structure sector 420 and an end seed 422 at the end of link structure sector 420. The description on start seed 421 and end seed 422 may refer to that of start seed 411 and end seed 412, and thus is omitted herein.

In an embodiment, link structure sector 420 may comprise a sector data portion 423. For example, sector data portion 423 may comprise a portion of a link structure table (for example, link structure table 600 of FIG. 6) or the whole link structure table. In particular, sector data portion 423 may comprise one or more link structure table entries. A link structure table entry may comprise a pointer to a control sector. In one embodiment, a link structure table entry may be associated with a child control sector that is identified by an index of a parent control sector. In another embodiment, a link structure table entry may comprise a pointer that may point to a child control sector identified by an index of a parent control sector. In yet another embodiment, a blank link structure table entry may correspond to an index that may be reserved for a new control sector to be written into the non-volatile memory. In another embodiment, each link structure table entry may locate at a predetermined location in the sector data portion of link structure sector 420. In yet another embodiment, each link structure table entry may be allocated sequentially in one or more link structure sectors.

In another embodiment, link structure sector 420 may comprise a type field 424. Type field 424 may comprise one or more bits. Type field 424 may indicate that the type of link structure sector 420. For example, type field 424 may indicate that sector 420 is a link structure sector or the like.

Referring again to FIG. 4(b), link structure sector 420 may comprise a version number 426. Version number 426 may comprise one or more bits. In one embodiment, version number 426 may indicate to which version link structure sector 420 belongs. For example, version number 426 may correspond to the number of times that a link structure table has been revised. In another embodiment, version number 426 may comprise a predetermined value corresponding to the number of times that a link structure table has been revised.

For example, a link structure sector with a larger version number may have a version revised more recently than that with a smaller version number. In other embodiments, version number 426 may be represented in a different format.

In one embodiment, link structure sector 420 may comprise a sector number 427. Sector number 427 may comprise one or more bits. Sector number 427 may identify a link structure sector belonging to a link structure table. In one embodiment, sector number 427 may comprise a serial number of the link structure sector. For example, if a link structure table is maintained in several link structure sectors, a link structure sector with a sector number "n" may represent that the link structure sector is the nth sector of the link structure table; however, in other embodiments, a link structure table may have a different number of link structure sectors, and sector number 427 may be represented by a different value.

Although sector data portion 423, type field 424, version number 426 and the sector number 427 are arranged, for example, in the order as shown in FIG. 4(b), other embodiments may employ different arrangements. In addition, the structure of a control sector is specifically described with reference to FIG. 4(b); however, other embodiments may use a different format. In one embodiment, each of sector data portion 423, type field 424, version number 426 and sector number 427 may be located at a predetermined position of a link structure sector.

In one embodiment, control sector 410 or link structure sector 420 may further comprise checksum data portion 418 or 428, respectively. In one embodiment, checksum data may be obtained by, for example, applying a predetermined algorithm to the sector data of a sector. In one embodiment, the checksum data may comprise one or more bits. In another embodiment, the checksum data may be used to determine a program state of a control sector or a link structure sector. For example, if the checksum data equals to the data calculated by applying a predetermined algorithm to the sector data of a sector and the sector comprises at least an end seed at the end of the sector, the programming of the sector may be determined as having been completed (Complete state). On the contrary, if the checksum value does not equal to the calculated data, the programming of the sector may be determined as not having been completed (In Progress state). In another embodiment, if each bit of a sector comprises "F" or "1", the programming of the sector may be determined as not having been made (Empty state). In another embodiment, checksum data portion may locate in a predetermined position of a control sector or a link structure sector.

FIG. 4(c) illustrates an embodiment of a data sector 430. In one embodiment, data sector 430 may comprise a sector data portion 433. For example, a file data sector of a file may comprise a sector data portion that may comprise a corresponding portion of or all of the data of the file.

Figure 5:
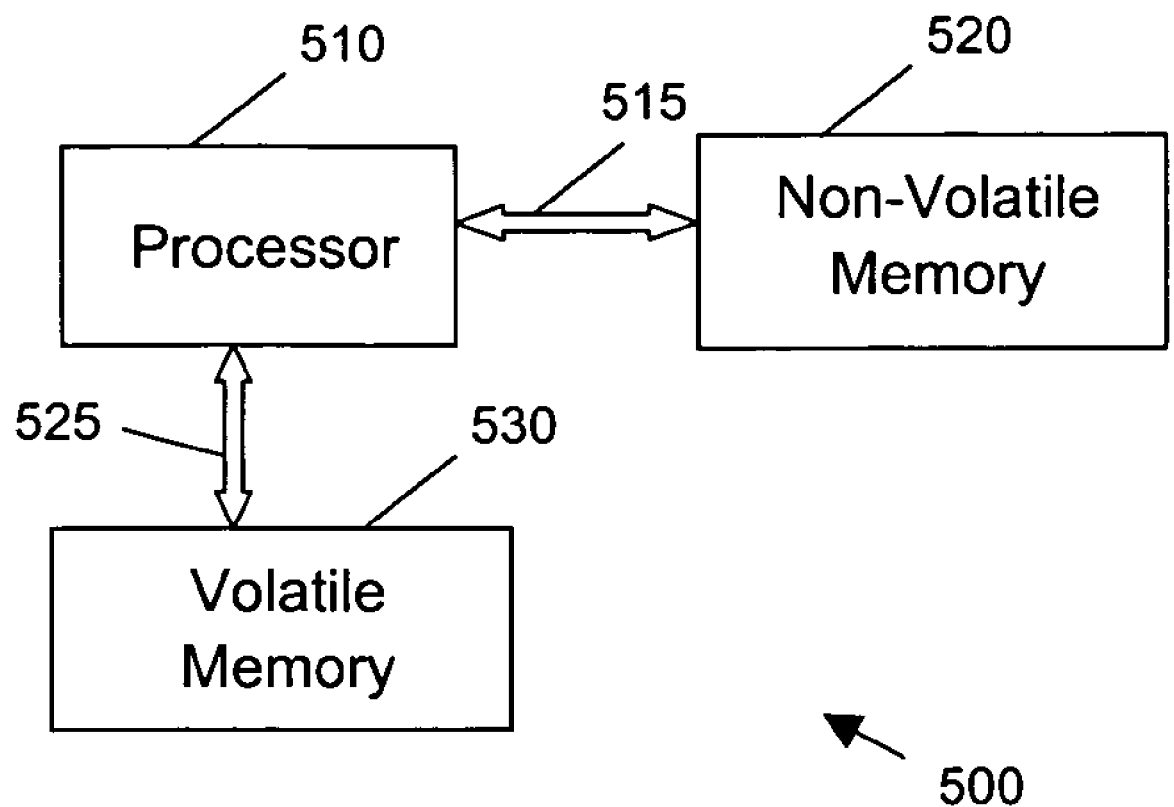
FIG. 5 illustrates an embodiment of a system of the present invention.

Now Referring to FIG. 5, a diagram of a system level overview according to one embodiment of the present invention is illustrated. As shown in FIG. 5, the system 500 includes a processor 510, a non-volatile memory 520 and a volatile memory 530. Processor 510 may be any type of processor adapted to perform operations in non-volatile memory 520 or volatile memory 530. For example, processor 510 may be a microprocessor, a digital signal processor, a microcontroller, or the like.

Non-volatile memory 520 may comprise flash memory, or the like. Processor 510 and non-volatile memory 520 may be coupled by bus 515. Volatile memory 530 may comprise RAM, or the like. Processor 510 and volatile memory 530 may be coupled by bus 525. In one embodiment, processor 510, non-volatile memory device 520 and the volatile memory 530 may be included on an integrated circuit board, and buses 515 and 525 may be implemented using traces on the circuit board. In another embodiment, processor 510, non-volatile memory 520 and the volatile memory 530 may be included within the same integrated circuit, and buses 515 and 525 may be implemented using interconnect within the integrated circuit.

Figure 7:
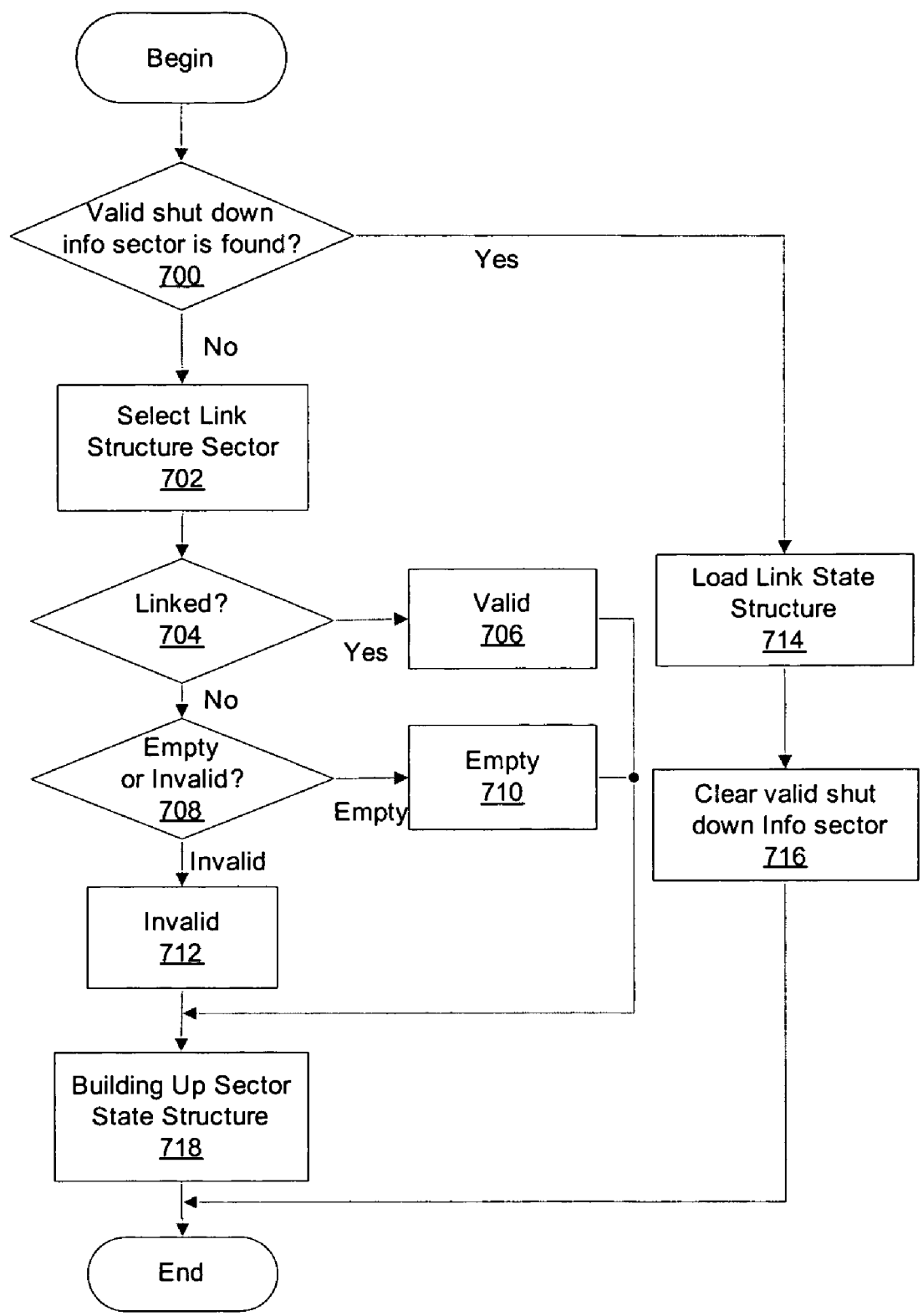
FIG. 7 is a flowchart illustrating an embodiment of a method that may be used to determine a link state of a sector in a file system of a non-volatile memory for power loss recovery (PLR).
Figure 8:
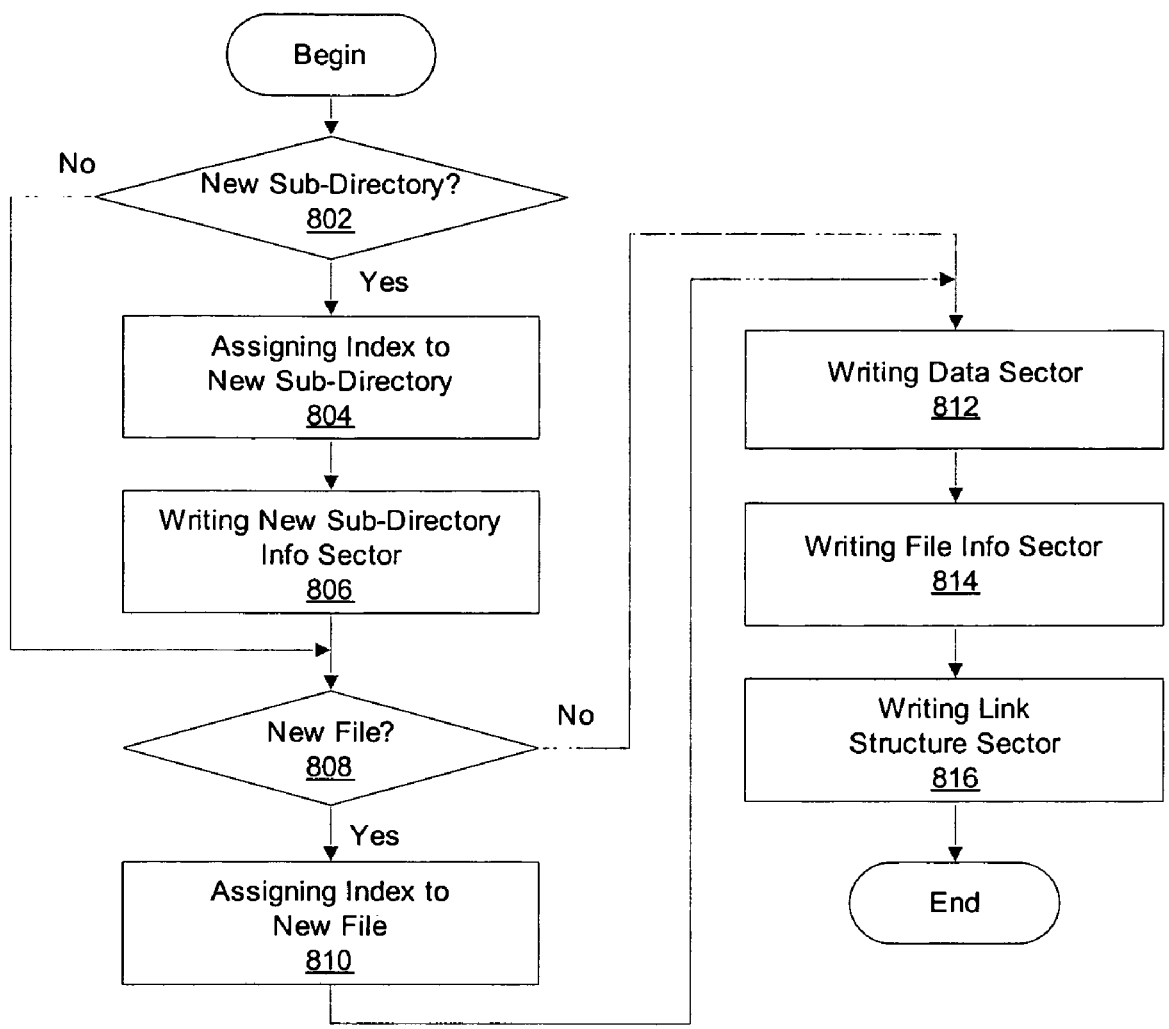
FIG. 8 is a flowchart illustrating a writing method according to an embodiment of the invention that may be used in a no bit-twiddling file system of a non-volatile memory.

Processor 510 may perform operations in non-volatile memory 520 or volatile memory 530. In one embodiment, processor 510 may perform operations in the method as shown in FIGS. 7 and 8, which will be described in the following paragraphs. In one embodiment, processor 510 may be not dedicated to the use of non-volatile memory 520, and processor 510 may perform operations in non-volatile memory 520 or volatile memory 530 while also performing other system functions.

An example method is illustrated in FIG. 7 that may be used by a processor 510 to determine a real state of a sector in non-volatile memory 520 for power loss recovery (PLR) in initialization. In one embodiment, processor 510 may determine a real state of a sector based on a link state thereof. In another embodiment, processor 510 may determine a real state of a sector based on a link state of the sector together with a program state thereof.

In block 700, processor 510 may determine whether a normal power loss occurs in system 500. In one embodiment, processor 510 may detect whether there are one or more valid shut down info sectors in non-volatile memory 520. FIG. 4(d) illustrates an embodiment of a shut down info sector 440. In one embodiment, shut down info sector 440 may comprise a start seed 441 at the beginning of shut down info sector 440 and an end seed at the end of shut down info sector 440. The description on start seed 441 and end seed 442 may refer to that of start seed 411 and end seed 412, and thus is omitted herein. In another embodiment, shut down info sector 440 may comprise a type field 444 that may indicate the type of shut down info sector 440. Type field 444 may comprise one or more bits. In one embodiment, type field 444 may indicate that sector 440 is shut down info sector or the like. Type field 444 may have a predetermined value corresponding to the type of shut down info sector 440.

Referring to FIG. 4(d), in one embodiment, shut down info sector 440 may comprise sector data portion 443 that may maintain a link state structure (or a portion thereof) of the file system of non-volatile memory 520. For example, FIG. 3 illustrates an embodiment of a link state structure 340, which will be described later. In one embodiment, processor 510 may maintain a link state structure in one or more shut down info sectors in response to a shut down request. In one embodiment, processor 510 may store a link state structure by writing one or more shut down info sectors each at a predetermined location of non-volatile memory 520. In another embodiment, processor 510 may store a link state structure in one or more predetermined continual sectors. In yet another embodiment, shut down info sector 440 may further comprise a checksum data portion 448. The description on checksum data portion 448 may refer to that of checksum data portion 418 and 428, and thus is omitted herein.

Referring again to FIG. 7, in block 700, processor 510 may determine that a sector in non-volatile memory 520 is a shut down info sector, in response to detecting that the sector has a type field indicating the type of shut down info sector. Processor 510 may determine said shut down info sector is valid, in response to finding a start seed at the beginning of the shut down info sector and an end seed at the end of the shut down info sector. In another embodiment, processor 510 may determine said shut down info sector is valid, in response to determining that the checksum data of the shut down info sector equals to data calculated by applying a predetermined algorithm to the sector data of the shut down info sector and the shut down info sector comprises at least an end seed. In one embodiment, processor 510 may load a link state structure of the file system of non-volatile memory 520 from one or more valid shut down info structure to volatile memory 530 (block 714), in response to detecting the one or more valid shut down information sectors. In block 716, processor 510 may clear the one or more valid shut down info sectors. In one embodiment, processor 510 may make the one or more valid shut down info sectors become empty. In another embodiment, processor 510 may clear the one or more valid shut down info sectors such that all bits of each valid shut down info sectors comprise "F" or "1". Conversely, processor 510 may go to block 702, in response to determining that no valid shut down info sector is found.

In block 702, processor 510 may select one or more link structure sectors in non-volatile memory 520. For example, processor 510 may detect in non-volatile memory 520 one or more valid link structure sectors that may comprise a start seed, an end seed, a type field indicating the type of link structure sector and may have a newest version. In one embodiment, processor 510 may scan non-volatile memory 520 to find a link structure sector. For example, processor 510 may determine a sector such as sector 308 is a link structure sector, in response to determining that sector 308 comprises a type field indicating the type of link structure sectors. In one embodiment, processor 510 may determine whether link structure sector 308 is complete based on a start seed and an end seed in link structure sector 308. For example, processor 510 may determine that link structure sector 308 is in a complete state, in response to determining that the link structure sector 308 comprises a start seed and an end seed. In another embodiment, processor 510 may determine that link structure sector 308 is in a complete state, in response to determining that link structure sector 308 comprises checksum data obtained by applying a predetermined algorithm to the sector data of link structure sector 308 and link structure sector 308 comprises at least an end seed. In another embodiment, processor 510 may determine that link structure sector 308 is the newest based on a version number in link structure sector 308. In one embodiment, processor 510 may select link structure sector 308 to determine link states of sectors, in response to determining that link structure sector 308 is complete and/or is the newest; however, in other embodiments, processor 510 may select a link structure sector in a different order.

In block 704, processor 510 may determine whether a sector of a non-volatile memory 520 is linked to the file system of non-volatile memory 520 based on the one or more link structure sectors that are selected, for example, in block 702. In one embodiment, in block 704, processor 510 may find a control sector that is linked to the file system of non-volatile memory 520 and may determine that a real state of the control sector is Valid (block 706), in response to determining that a link structure table entry associated with the control sector (for example, a pointer to the control sector) is found in a selected link structure sector. In another embodiment, processor 510 may determine the link state of a data sector based on a linked control sector. In particular, in block 704, processor 510 may find a data sector that is linked to the file system of non-volatile 520 and may determine that a real state of the data sector is Valid (block 706), in response to determining that the data sector is pointed to by a pointer of a linked control sector. In particular, in block 704, processor 510 may find a file data sector that is linked and may determine that a real state of the file data sector is Valid (block 706), in response to determining that a linked file info sector comprises a pointer to the file data sector.

In block 708, in one embodiment, processor 510 may determine whether a real state of an unlinked sector is Empty or Invalid. In one embodiment, processor 510 may determine that a real state of an unlinked sector is empty (block 710), in response to determining that the unlinked sector has not been written; conversely, processor 510 may determine that the real state of the unlinked sector is Invalid (block 712). For example, processor 510 may determine that a real state of an unlinked sector is empty (block 710), in response to determining that each bit of the unlinked sector comprise an initial value, for example, "F" or "1"; conversely, processor 510 may determine that the real state of the unlink sector is Invalid (block 712). In another embodiment, in block 708, processor 510 may determine that the real state of an unlinked sector is Invalid. For example, processor 510 may determine that an unlinked sector is Invalid, in response to determining that at least one bit of the unlinked sector has been written. In another embodiment, processor 510 may determine that a real state of an unlinked sector is Invalid, in response to determining that the unlinked sector comprises a start seed at the beginning of the unlinked sector. In another embodiment, processor 510 may determine that a real state of an unlinked sector is Invalid, in response to determining that the unlinked sector comprises checksum data having a predetermined relationship with the sector data of the unlinked sector. For example, the checksum data may be obtained by applying a predetermined algorithm to the sector data. In yet another embodiment, processor 510 may determine that a real state of an unlinked sector is Invalid, in response to determining that at least one bit of the unlinked sector comprises an updated value, such as, "0".

The following Table 1 shows an embodiment of the relationship between the link and program states of a sector and a real state of the sector that may be determined according to the method of FIG. 7.

TABLE 1

| Link State | Program State | Real State |
|---|---|---|
| Linked | Empty | Valid |
|  | Complete | Valid |
| Unlinked | Empty | Empty |
|  | Complete | Invalid |
|  | In progress | Invalid |

In block 718, processor 510 may build up in volatile memory 530 a link state structure of the file system of non-volatile memory 520, for example, based on a link state of each sector. In one embodiment, processor 510 may build up a link state structure that may reflect a link state of each sector in a file system of a non-volatile memory. For example, the link state structure may comprise a sector map of the file system of the non-volatile memory. In one embodiment, processor 510 may store the link state structure in a volatile memory such as volatile memory 530 as shown in FIG. 5. In another embodiment, blocks 706, 708, 710 and 712 for building up a link state structure. The volatile memory may comprise a RAM or the like. In yet another embodiment, processor 510 may build up in volatile memory 520 in volatile memory 530 a real state structure of the file system of non-volatile memory 520. For example, processor 510 may build up a real state structure that may reflect a real state of each sector in the file system of non-volatile memory 520. Processor 510 may store the real state structure in volatile memory 530.

Referring to FIG. 3, an embodiment of a link state structure 340 is shown. For example, link state structure 340 may comprise a sector map. In one embodiment, link state structure 340 may comprise a plurality of columns (such as three) that may each correspond to a block of the file system of non-volatile memory. Each column of the link state structure 340 may comprise a plurality of rows (such as eight) that may each correspond to a corresponding sector of a block. Each item in the link state structure 340 may comprise a predetermined value that may represent a link state of a corresponding sector. In one embodiment, link state structure 340 may comprise a bitmap, wherein "0" may be used to represent a sector linked into the file system and "1" may be used to represent a sector not linked into the file system. In another embodiment, "1" may be used in a bitmap to represent the linked state of a sector while the number "0" may be used to represent the unlinked state of a sector. In yet another embodiment, one or more bits in a variety of forms may be used to represent the linked or unlinked state of individual sector. In one embodiment, the real state structure as mentioned above may have a structure similar to that of link state structure 340. For example, the real state structure may use different predetermined values to represent the real states. For example, a first predetermined value may be used to represent a real state of Valid; a second predetermined value may be used to represent Empty; and a third predetermined value may be use to represent Empty.

While the method of FIG. 7 is illustrated as a sequence of operations, processor 510 in some embodiments may perform illustrated operations of the method in a different order. Although an embodiment of a method is described according to FIG. 7 that may be used in processor 510 to determine a real state of a sector in a non-volatile memory 520, other embodiments may employ a different process.

An example method is illustrated in FIG. 8 that may be used by processor 510 to write data in non-volatile memory 520. In the following, the example method will be described with reference to FIG. 3.

In block 802, processor 510 may determine whether data to be written to non-volatile memory 520 involves a new directory or node of the file system of non-volatile memory 520. For example, processor 510 may determine whether file A involves a new sub-directory in the file system of non-volatile memory 520; however, in other embodiments, processor 510 may determine whether file A involves different directories to allow for other non-volatile memory with different file systems. In one embodiment, processor 510 may determine that a new sub-directory is involved, in response to determining that linked root directory info sector (a control sector of a parent directory) does not comprise an index or ID associated with the new sub-directory.

In block 804, in response to determining that a new directory is involved, processor 520 may assign to the new directory a reserved index in a linked control sector of a parent directory. For example, in response to determining that file A involves a new sub-directory, processor 510 may assign a reserved index or ID (for example a reserved index 311) of root directory info sector 301 to the new sub-directory, and processor 510 may write a sub-directory info sector, for example, 302, associated with the new sub-directory to non-volatile memory 520 (block 806). In one embodiment, the sub-directory info sector may comprise a sector data portion that may comprise the assigned index or ID of the new sub-directory. Conversely, processor 510 may jump to block 808, in response to determining that an old sub-directory is involved.

In block 808, processor 510 may determine whether file A is a new file (or node) of the file system of non-volatile memory 520. For example, processor 510 may determine that file A belongs to a new node, in response to determining that an index associated with file A (for example, an index to file A or an ID of file A) is not found in a linked control sector of a parent directory, for example, a linked sub-directory info sector 302. In block 810, in one embodiment, processor 510 may assign to file A a reserved index in a linked control sector of a parent directory (for example, sub-directory info sector 302), in response to determining that file A is a new file of the file system of non-volatile memory 520. In one embodiment, the reserved index (for example index 312) may comprise an ID. For example, processor 510 may assign to file A an ID that is originally reserved for a new sector. Conversely, processor 510 may jump to block 812, in response to determining that file A belongs to an old node of the file system of non-volatile memory 520.

In block 812, processor 510 may write one or more data sectors to non-volatile memory 520. In the example of FIG. 3, processor 510 may write file data sectors 304-307 of file A to non-volatile memory 520. In block 814, processor 510 may write file info sector 303 of file A to non-volatile memory 520. In one embodiment, file info sector 303 may comprise pointers 314-317 each pointing to file data sectors 304-307, respectively. In another embodiment, file info sector 303 may comprise a start seed, an end seed and/or a type field indicating the type of file info sector 303, a sector data portion that may comprise the index or ID assigned to file A, etc., and/or a checksum data portion having a predetermined relationship with the sector data portion.

In block 816, processor 510 may write to non-volatile memory 520 a link structure sector 308 to reflect the writing of one or more sectors. In one embodiment, processor 510 may write one or more link structure sectors (for example, link structure sector 308) that may comprise a first link structure table entry identified by the reserved index assigned to file info sector 303 and may comprise a second link structure table entry identified by the reserved index assigned to sub-directory info sector 302, in response to determining that file A involves a new sub-directory and belongs to a new node of the file system. In another embodiment, the first link structure table entry may comprise a pointer to file info sector 303. In another embodiment, the second link structure table entry may comprise a pointer to sub-directory info sector 302. In yet another embodiment, processor 510 may write a link structure sector 308 that may further comprise a start seed at the beginning of link structure sector 308, an end seed at the end of link structure sector 308. The link structure sector 308 may further comprise a type field indicating the type of link structure sector and a version number, a sector number, and/or a checksum data portion. Conversely, processor 510 may write a link structure sector (for example, link structure sector 308) that may comprise a first link structure table entry identified by the reserved index assigned to file info sector 303, in response to determining that file A does not involve a new sub-directory but belongs to a new node of the file system. In another embodiment, processor 510 may write a link structure sector (for example, link structure sector 308) that may comprise a first link structure table entry identified by the ID of file A, in response to determining that file A does not involve a new sub-directory or belong to a new node of the file system.

While the method of FIG. 8 is illustrated as a sequence of operations, the processor 510 in some embodiments may perform illustrated operations of the method in a different order. Further, processor 510 may write a different number of sectors in other embodiments.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system comprising:
a non-volatile memory comprising a file system;
a volatile memory comprising a link structure, wherein the link structure includes a link state of a sector in the file system; and
a processor to determine a real state of a sector of the non-volatile memory based on the link state of the sector and a program state of the sector, wherein
the real state of the sector includes whether the sector is empty, valid, invalid, or corrupt,
the link state indicates whether the sector is linked to the file system of the non-volatile memory, and
the program state indicates whether or not data has been written to the sector and, if data has been written to the sector, whether or not the writing of the data to the sector was complete.

2. The system of claim 1, wherein the processor further to build up in the volatile memory a real state structure of the file system of non-volatile memory based on the real state of the sector.

3. The system of claim 1, wherein the processor further to determine that the real state of the sector is valid, in response to determining that the sector is linked to the file system.

4. The system of claim 1 wherein the processor further to determine that the real state of the sector is empty, in response to determining that the sector is unlinked to the file system and each bit of the sector has an initial value.

5. The system of claim 1 wherein the processor further to determine that the real state of the sector is invalid, in response to determining that the sector is unlinked to the file system and at least one bit of the sector has an updated value.

6. The system of claim 1 wherein the processor further to determine that a control sector is linked to the file system, in response to determining that a link structure sector, indicating the link structure of the file system, comprises a pointer to the control sector.

7. The system of claim 1 wherein the processor further to determine that a data sector is linked to the file system, in response to determining that a linked control sector comprises a pointer to the data sector.

8. The system of claim 1 wherein the processor further to select a valid link structure sector that comprises a first seed at a start of the sector, a second seed at an end of the sector, a type field indicating that the type of the sector is a link structure sector, and has a newest version.

9. The system of claim 1 wherein the processor further to transfer to the volatile memory a link state of the sector from a valid shut down info sector that indicates a normal shut down in the system.

10. The system of claim 9 wherein the processor further to clear the valid shut down info sector so that the shut down info sector becomes empty.

* * * * *